Aug. 8, 1967  A. L. FACCOU  3,334,926
BALL PIPE JOINT
Filed June 25, 1964  2 Sheets-Sheet 1
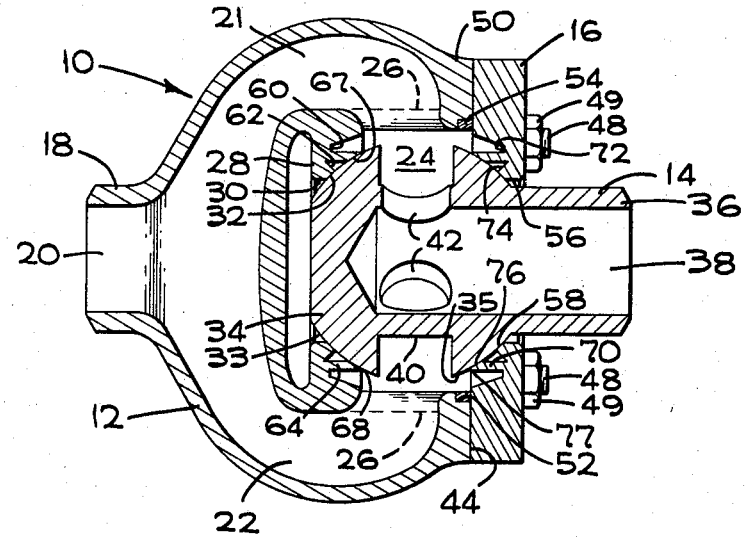
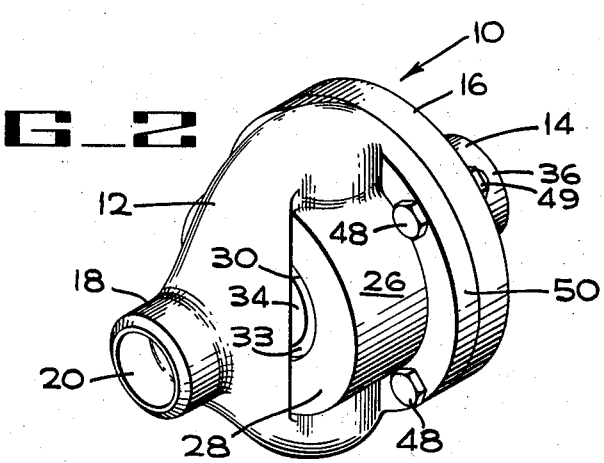
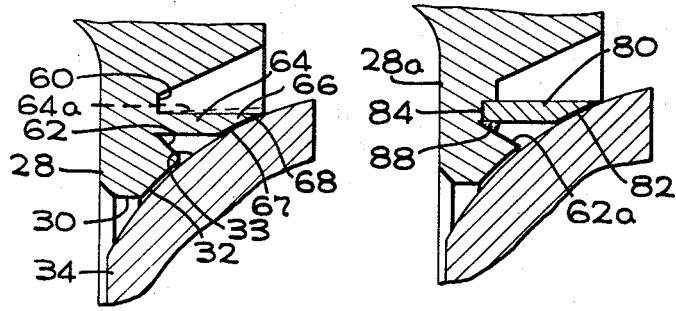
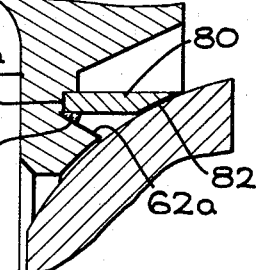
INVENTOR
ARMAND L. FACCOU
BY Hans G. Hoffmeister
ATTORNEY

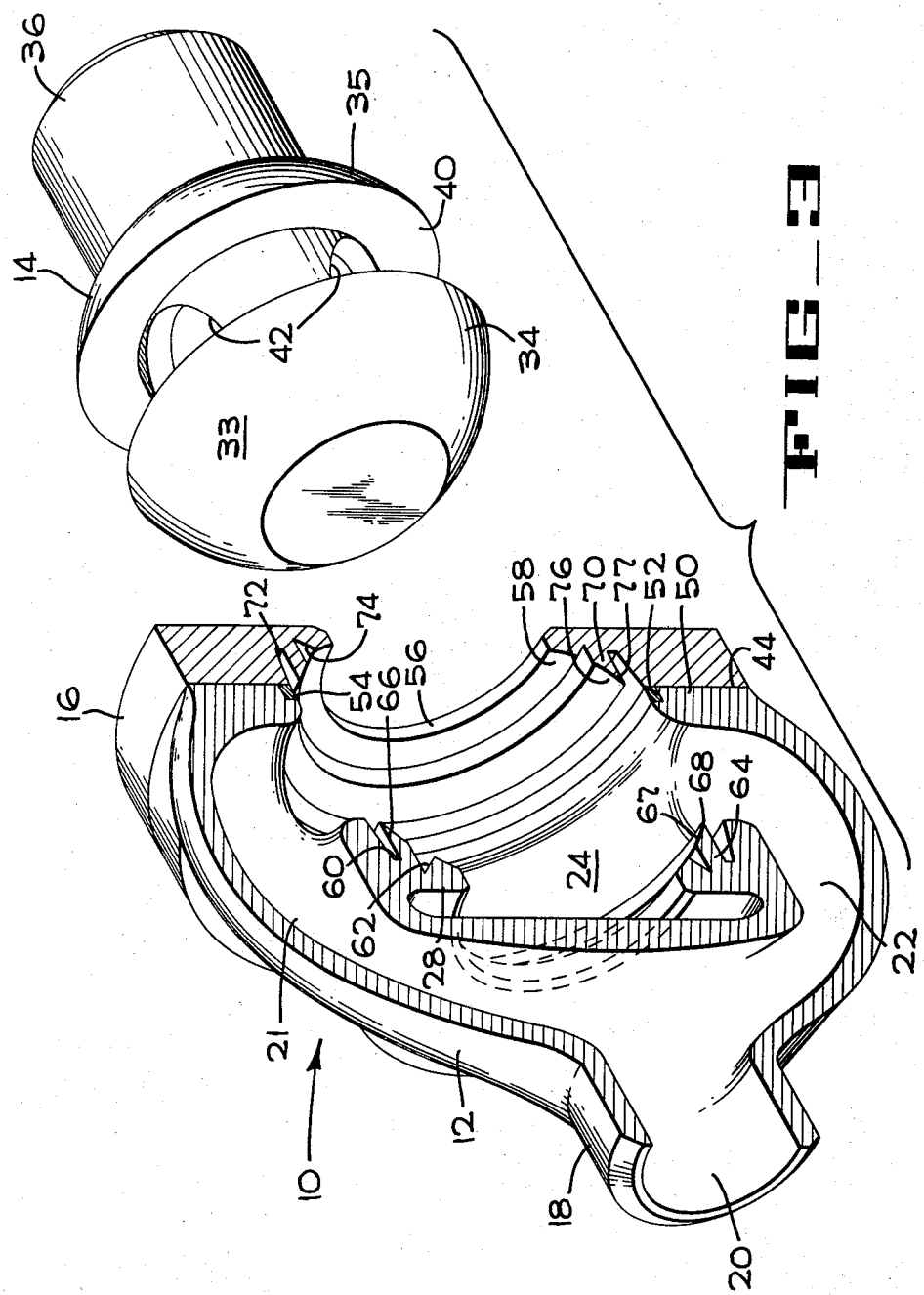

United States Patent Office 3,334,926
Patented Aug. 8, 1967

1

3,334,926
BALL PIPE JOINT
Armand L. Faccou, Santa Ana, Calif., assignor to FMC Corporation, San Jose, Calif., a corporation of Delaware
Filed June 25, 1964, Ser. No. 377,877
3 Claims. (Cl. 285—110)

The present invention pertains to a ball pipe joint and more particularly to a ball joint capable of handling fluids at high pressure and temperature ranges.

Certain ball joints that are presently in use cannot safely and satisfactorily handle fluids at temperatures in the order of 700 degrees F. and pressures in the order of 3000 p.s.i. Failure in the sealing means employed and excess thermal expansion of the joint at high temperatures impairs the normal clearances between the relatively movable parts of the joint whereby the turning torque becomes objectionable or the seal is impaired.

In accordance with the present invention, the above stated shortcomings are overcome by utilizing pressure balanced, wholly metallic sealings means, and particular structural arrangements within the joint to prevent binding.

Accordingly, an object of the present invention is to provide an improved ball pipe joint for conducting fluids at high pressures and temperatures.

Another object of the invention is to provide a ball pipe joint capable of high temperature and high pressure service wherein the pressure and temperature variations do not adversely affect the turning torque and do not bind or damage the joint.

Another object is to provide a ball pipe joint which requires no organic or synthetic seals or packings.

Other objects and advantages of the present invention will become evident from the following description and from the accompanying drawings, wherein:

FIGURE 1 is a longitudinal section through the ball pipe joint of the present invention.

FIGURE 2 is a perspective of the ball pipe joint.

FIGURE 3 is an enlarged exploded perspective, partly in section, of the ball pipe joint of FIGURE 2.

FIGURE 4 is an enlarged fragmentary detail of the joint particularly showing how a metal-to-metal seal is obtained in the joint.

FIGURE 5 is a view similar to FIG. 4 but shows a modification of the joint.

The ball pipe joint 10 (FIGS. 1–3) comprises three major parts, namely, female coupling member 12, a male coupling member 14 and a closure ring flange 16. The coupling member 12 is hollow, and the coupling member 14 is mounted within the coupling member 12 for rotation and limited angular displacement relative to the coupling member 12. The assembled and sealed relation of the coupling members 12 and 14 is maintained by the closure ring flange 16 which is secured to the coupling member 12. Fluid flow through the ball pipe joint 10 may be in either direction and may be at pressures as high as 3000 p.s.i. and at temperatures as high as approximately 700 degrees F.

More specifically, the coupling member 12 is an integral metal casting provided with a conventional welding neck 18 which may be welded to a flow line, not shown, for conducting fluid either to or from the ball pipe joint 10. The bore 20 of the welding neck 18 merges with diverging flow passages 21 and 22, in the coupling member 12, that have remote end portions communicating with a ball chamber 24 that is defined by a cylindrical wall 26. The bore 20 and the flow passages 21 and 22 thus define a Y shaped flow path which has adjacent ends in peripheral communication with the ball chamber 24, and an opposite end adapted for connection to a flow line. The chamber 24 has an annular inner end wall 28 that is concentric with the ball chamber 24 and with the welding neck 18. The annular wall 28 (FIGS. 1 and 3) is provided with an axial inner surface 30 that merges with a circumferential concave bearing surface 32.

The bearing surface 32 has the same curvature as the convex inner zonal portion 33 of a partially spherical ball knuckle 34 which is formed on the inner end of the coupling member 14. The coupling member 14 also includes a welding neck 36 for securing the outer end of the coupling member to a flow line, not shown, and a fluid conducting bore 38 extends through the welding neck into the ball knuckle 34. The knuckle has an annular groove 40 and a plurality of circumferentially spaced radial apertures or ports 42 that connect the groove 40 and the bore 38 so that fluid within the chamber 24 is readily conducted to either the passages 21 and 22, or to the bore 38, depending upon the direction of flow.

When the joint 10 is assembled, an end surface 44 (FIGS. 1 and 3) of the coupling member 12 is engaged by a corresponding surface of the closure ring flange 16. Means for removably attaching the closure flange 16 is provided by a plurality of studs 48 which are provided with nuts 49 and extend through the flange 16 and through an adjacent flange 50 (FIG. 2) of the coupling member 12.

In order to effect a fluid-tight static seal along the interface of the flanges 50 and 16 (FIGS. 1 and 3), the flange 50 is provided with an annular recess 52, and a deformable metal seal or crush ring 54 is mounted therein. The axial dimension of the seal ring 54 is initially larger than the corresponding dimension of the recess, whereby the closure flange 16, in being clamped to the flange 50 by tightening the nuts 49 on the studs 48, causes the seal ring 54 to be compressed into sealing engagement with the coupling member 12 and the closure flange.

The closure ring flange 16 is provided with an aperture defined by an axial wall 56 that circumscribes the projecting welding neck 36 and merges with a circumferential, concave bearing surface 58 having a curvature matching the curvature of the convex outer zonal portion 35 of the ball knuckle 34. The axial spacing between the confronting bearing surfaces 32 and 58, when the closure flange 16 is drawn up tightly against the coupling member 12, is such that the ball knuckle 34 has a sliding fit with the bearing surfaces 32 and 58. It is preferable that the zonal portions of the ball knuckle 34 be chromium plated to minimize the possibility of galling or seizing in the absence of lubrication. It will be apparent that the wall 56 limits the angular displacement of the coupling member 14 relative to the coupling member 12, and that the convex zonal portions 33 and 35 of the ball knuckle 34 engage the bearing surfaces 32 and 58 whatever the angular relation of the two coupling members 12 and 14.

A thin annular sealing lip or ring 64 projects from the wall 28 toward the knuckle 34, outward of the bearing surface 32, and thereby defines two radially spaced annular relieved portions 60 and 62. The distal end 66 of the sealing lip 64 has a concave ball seating face 67, the radius of curvature of which is complementary to the radius of curvature of the inner and outer zonal portions 33 and 35 of the ball knuckle 34; in its unstressed condition the maximum diameter of the lip 64 at its outer edge 68 is, however, greater than the minimum diameter of the inner zonal portion but less than the maximum diameter thereof.

The closure flange 16 is similarly provided with a thin inwardly projecting sealing lip or ring 70 and with adjacent annular relieved portions 72 and 74. The free end of the sealing lip 70 has a concave ball seating face 76 which has a radius of curvature complementary to the radius of curvature of the zonal portion 35 of the ball knuckle 34. As in the case of the sealing lip 64, the maximum diameter of the lip 70 at its outer edge 77 when the sealing lip is unstressed, is respectively greater and less than the minimum and maximum diameters of the outer zonal portion 35.

Thus, before the closure flange 16 is bolted up tight during assembly of the ball joint 10, the outer edges 68 and 77 (FIGS. 1, 3 and 4) of the sealing lips 64 and 70 first contact the zonal portions 33 and 35 of the ball knuckle 34, and as the nuts 49 on the studs 48 are tightened, both sealing lips are uniformly flexed radially outward by the zonal portions 33 and 35 of the knuckle. Due to such flexure, the outer surface of the sealing lip 64 thus coincides with the dotted line 64a (FIG. 4), and the sealing lip 70 is similarly flexed. When the zonal portions 32 and 58, the seating faces 67 and 76 of the sealing lips 64 and 70 are in substantially total metal-to-metal sealing contact with their respective zonal portions and the ball knuckle is, in effect, resiliently gripped by the sealing lips. As a consequence, the sealing lips attain an efficient fluid sealing action against the ball knuckle without appreciably impairing relative rotation between the ball knuckle and the sealing lips. Further, when the joint is placed in service, the fluid sealing action is enhanced by the substantial positive hydrostatic pressure of the fluid in the chamber 24 because the relatively thin sealing lips 64 and 70 are forced by the pressure radially inward against the ball knuckle 34. The sealing action of the sealing lips 64 and 70 thus increases proportionately to increase in the fluid pressure. The sealing lips 64 and 70 are of identical size and area whereby no pressure-induced end thrust acts upon the coupling member 14 thereby also facilitating swivelling and other movement at high as well as low pressures.

If the ball pipe joint 10 is subjected to severe wear conditions, such as may be caused by coupling it to flow line conduits handling entrained abrasives or to conduits which are subject to frequent changes in aligment and/or relative rotation, the modified form of the sealing lip construction and mounting shown in FIGURE 5 might be preferable because it provides for replacement of the sealing lips when they become worn. The sealing lip 80 (FIG. 5) is formed of metal, as with lips 64 and 70, and is provided with the same curvature on its free end 82, as the sealing lips 64 and 70, but is axially longer so that when it is seated in an annular groove 84 of the wall 28a it bears the same operative relation to the ball knuckle 34 as the sealing lip 64. Suitable materials for the sealing lip 80 are, for example, carbon steel, stainless steel, Inconel X, and the like. An adjacent annular relieved portion 62a provides access to one side of the sealing lip 80 whereby in the unassembled joint the lip may be bonded, as at 88, to the wall 28a by well known metal working techniques, such as silver-soldering. When the sealing lip 80 is worn to the point where its sealing action is impaired, the sealing lip can be unbonded and replaced by a new sealing lip. Accordingly, if the replaceable sealing lip 80 is used instead of the integral sealing lips 64 and 70, the female coupling member 12 and the closure flange 16 have a much longer useful life.

In summary, therefore, the ball pipe joint 10 is particularly advantageous in handling hot fluids at high pressure because there are no organic or synthetic substances which might rapidly deteriorate from the heat, and because the diametric flexibility of the metal sealing lips 64, 70 and 80 permits high pressure fluid to increase the sealing action. However, even though the fluid pressure remains at its lowest, the sealing action is already effective due to the stressed condition of the sealing lips before the ball joint is placed in service. It is evident, too, that the ball pipe joint 10 is useful in handling corrosive fluids when the metal of which it is made is inert to the fluid being handled. Furthermore, the subject joint achieves a high unit loading of the sealing interfaces without unduly increasing the torque required to effect relative rotation of the coupling members 12 and 14.

While a particular embodiment of the present invention has been shown and described it will be understood that the particular details herein set forth are capable of modification and variation without departing from the principles of the invention and that the scope of the invention should be limited only by the scope and proper interpretation of the claims appended hereto.

The invention having thus been described, that which is believed to be new, and for which protection by Letters Patent is desired, is:

1. A ball pipe joint comprising a hollow female coupling member having intercommunicating fluid conducting passages, means interiorly of said female member defining divergent fluid flow paths, said means including a cylindrical wall integral with the outer wall of said female member and circumscribing one of said fluid conducting passages, said cylindrical wall being formed with passages intercommunicating the interior of said cylindrical wall with said flow paths, said female coupling member having a fixed annular bearing surface inwardly of said cylindrical wall, a hollow male coupling member having a partially spherical end portion disposed in said female coupling member and having an elongated tubular neck merging with said spherical end portion and projecting from one of said passages in said female coupling member, a closure ring flange secured to said female coupling member in circumscribing relation to a portion of said spherical end portion of said male coupling member, said closure ring flange being formed with a central annular bearing surface, the partially spherical end portion of said hollow male coupling member being adapted to engage said annular bearing surfaces of said female coupling member and said closure ring flange when said joint is assembled, a first annular metal sealing ring carried by said female coupling member in sealing relation therewith and radially outwardly of said annular bearing surface thereof, said first sealing ring having an end surface complemental to the confronting surface of said spherical end portion of said male coupling member, and a second annular metal sealing ring carried by said closure ring flange in sealing relation therewith and radially outwardly of said annular bearing surface of said ring flange, said second sealing ring having an end surface complemental to and engaging the confronting surface of said spherical end portion of said male coupling member, said first and second sealing rings being diametrically outwardly stressed when said joint is assembled thereby providing a slidable fluid seal between said male and female coupling members to permit relative angular displacement therebetween, the radially outer surfaces of said first and second sealing rings being directly exposed to the fluid pressure within the joint thereby to enhance the fluid sealing action.

2. A ball pipe joint according to claim 1, wherein said first and second sealing rings are separately formed and removably secured to said female coupling member and said closure ring flange, respectively, to permit replacement thereof.

3. A ball pipe joint according to claim 1, wherein said sealing rings are integral with said female coupling member and said closure ring flange, respectively.

References Cited

UNITED STATES PATENTS

| | | | |
|---|---|---|---|
| 751,273 | 2/1904 | Fahrney | 285—152 |
| 1,563,161 | 11/1925 | Christenson | 285—271 X |
| 1,838,740 | 12/1931 | Burham | 285—271 X |
| 2,824,758 | 2/1958 | Cattrell | 285—262 X |
| 3,069,187 | 12/1962 | Collins et al. | 285—110 |
| 3,098,662 | 7/1963 | Iversen | 285—18 |

CARL W. TOMLIN, *Primary Examiner.*

D. W. AROLA, *Assistant Examiner.*